(12) United States Patent
Kim et al.

(10) Patent No.: US 10,535,147 B2
(45) Date of Patent: Jan. 14, 2020

(54) ELECTRONIC APPARATUS AND METHOD FOR PROCESSING IMAGE THEREOF

(71) Applicant: SAMSUNG ELECTRONICS CO., LTD., Suwon-si, Gyeonggi-do (KR)

(72) Inventors: Sung-hyun Kim, Yongin-si (KR); Bo-eun Kim, Seoul (KR); Jong-in Lee, Seoul (KR); Yong-deok Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 125 days.

(21) Appl. No.: 15/811,963

(22) Filed: Nov. 14, 2017

(65) Prior Publication Data
US 2018/0144488 A1  May 24, 2018

(30) Foreign Application Priority Data
Nov. 18, 2016  (KR) .................. 10-2016-0153965

(51) Int. Cl.
*G06T 7/30*  (2017.01)
*G06T 3/00*  (2006.01)
*G06T 5/00*  (2006.01)

(52) U.S. Cl.
CPC .............. *G06T 7/30* (2017.01); *G06T 3/0043* (2013.01); *G06T 3/0062* (2013.01); *G06T 5/006* (2013.01)

(58) Field of Classification Search
CPC .......... G06T 7/30; G06T 5/006; G06T 3/0043
See application file for complete search history.

(56) References Cited

U.S. PATENT DOCUMENTS

| | | |
|---|---|---|
| 8,896,601 B1 | 11/2014 | Norman |
| 2013/0314444 A1 | 11/2013 | Iwamoto et al. |
| 2014/0152655 A1 | 6/2014 | Johnston et al. |
| 2015/0163447 A1 | 6/2015 | Kim et al. |
| 2015/0172620 A1 | 6/2015 | Guo et al. |
| 2016/0005435 A1 | 1/2016 | Campbell et al. |
| 2016/0103213 A1 | 4/2016 | Ikram et al. |
| 2016/0104054 A1 | 4/2016 | Lin et al. |
| 2016/0300323 A1 | 10/2016 | Nakagawa et al. |

FOREIGN PATENT DOCUMENTS

| | | |
|---|---|---|
| JP | 2012-244479 | 12/2012 |
| JP | 2013-243610 | 12/2013 |
| JP | 2016-081425 | 5/2016 |
| KR | 10-0758304 | 9/2007 |
| KR | 10-2013-0025005 | 3/2013 |

(Continued)

OTHER PUBLICATIONS

Search Report and Written Opinion dated Feb. 13, 2018 in counterpart International Patent Application No. PCT/KR2017/012748.

(Continued)

*Primary Examiner* — Qian Yang
(74) *Attorney, Agent, or Firm* — Nixon & Vanderhye P.C.

(57) ABSTRACT

An electronic apparatus is provided. The apparatus includes a storage and a processor configured to convert an original image to a spherical image, to acquire a plurality of two-dimensional (2D) images corresponding to a respective plurality of points on the spherical image by projecting the spherical image onto a plane with reference to the respective plurality of points on the spherical image, and to store the acquired 2D images in the storage.

20 Claims, 18 Drawing Sheets

(56) References Cited

FOREIGN PATENT DOCUMENTS

KR       10-1277188       6/2013
KR   10-2016-0018274       2/2016

OTHER PUBLICATIONS

EP Extended Search Report dated Aug. 14, 2019 for EP Application No. 17871987.8.
Zelnik-Manor et al., "Squaring the Circle in Panoramas", Computer Vision, 2005, ICCV 2005; 10$^{th}$ IEEE International Conference, Oct. 17-20, 2005, vol. 2, pp. 1292-1299.

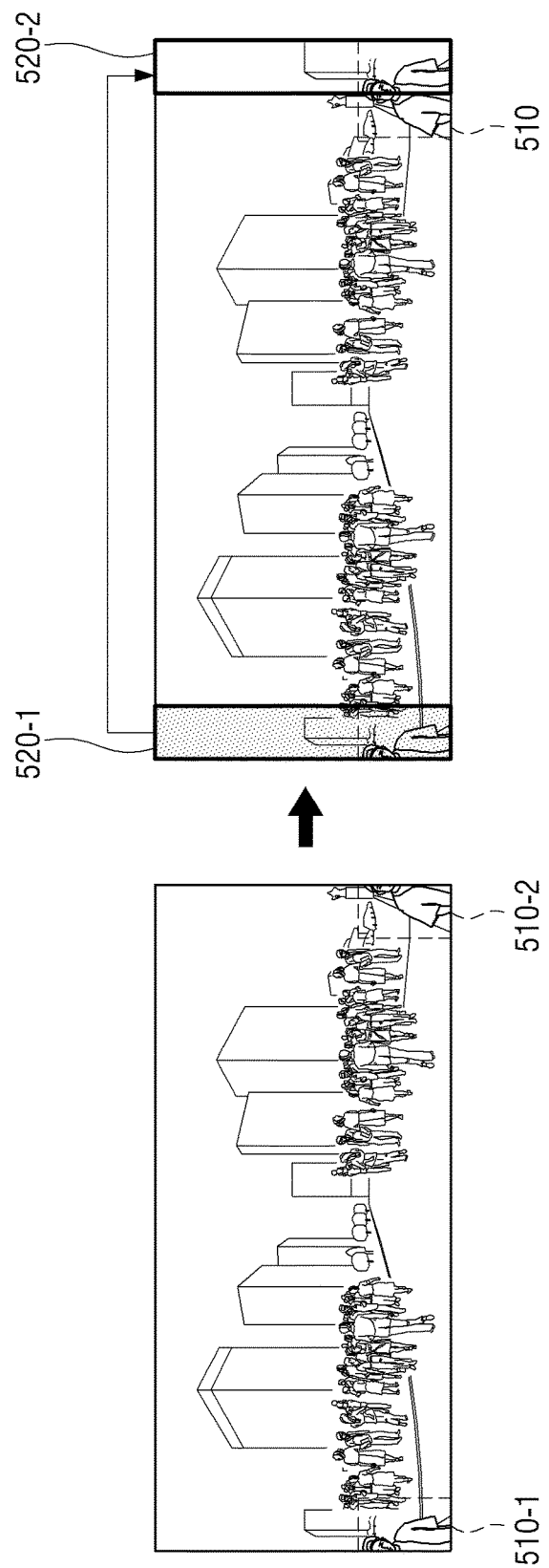

FIG. 6
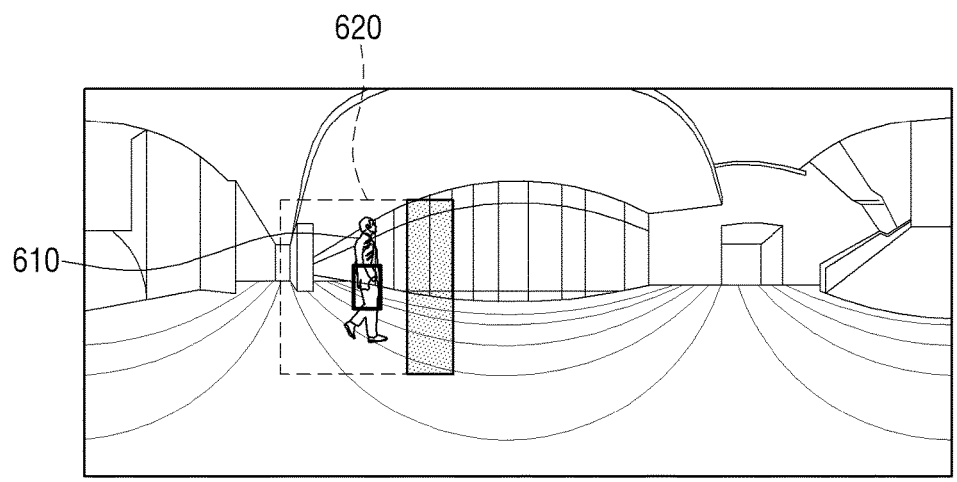
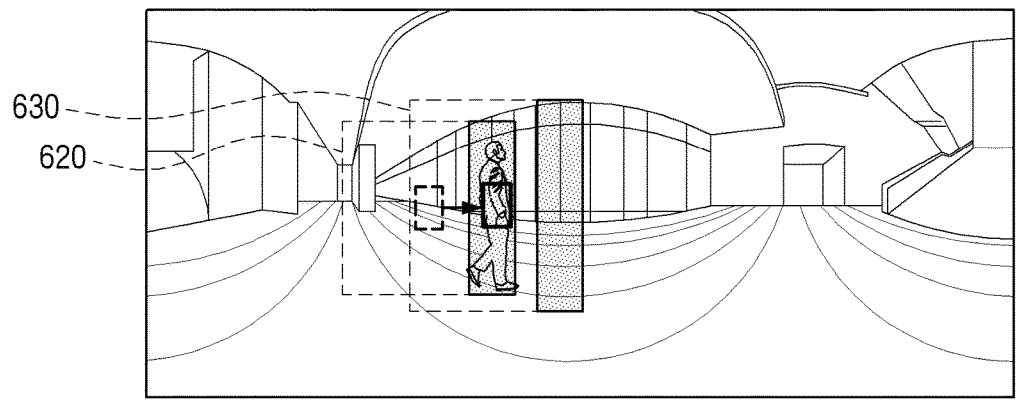
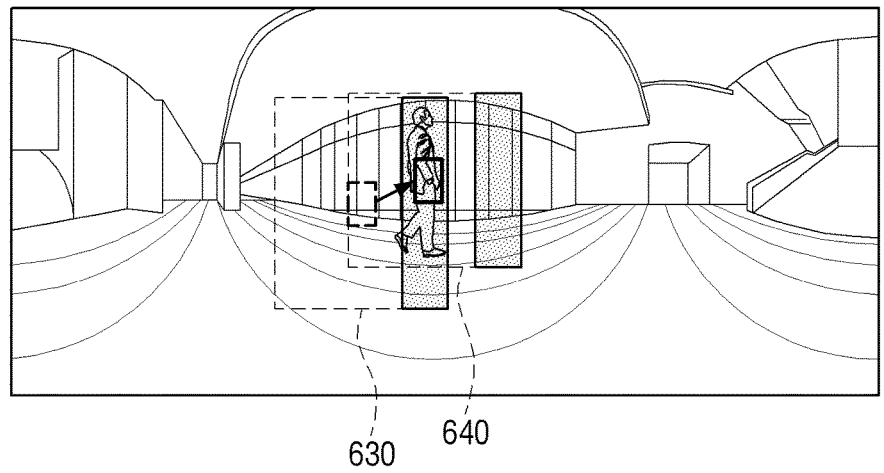

FIG. 8
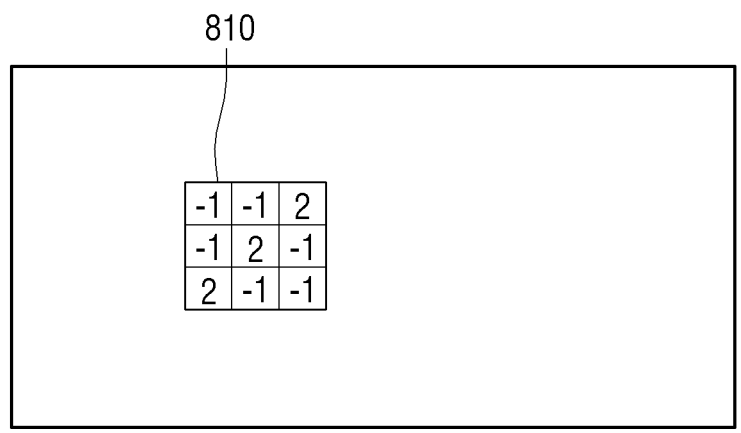
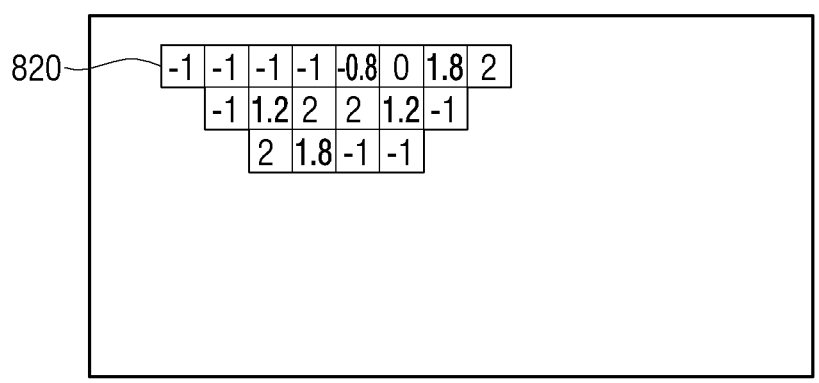

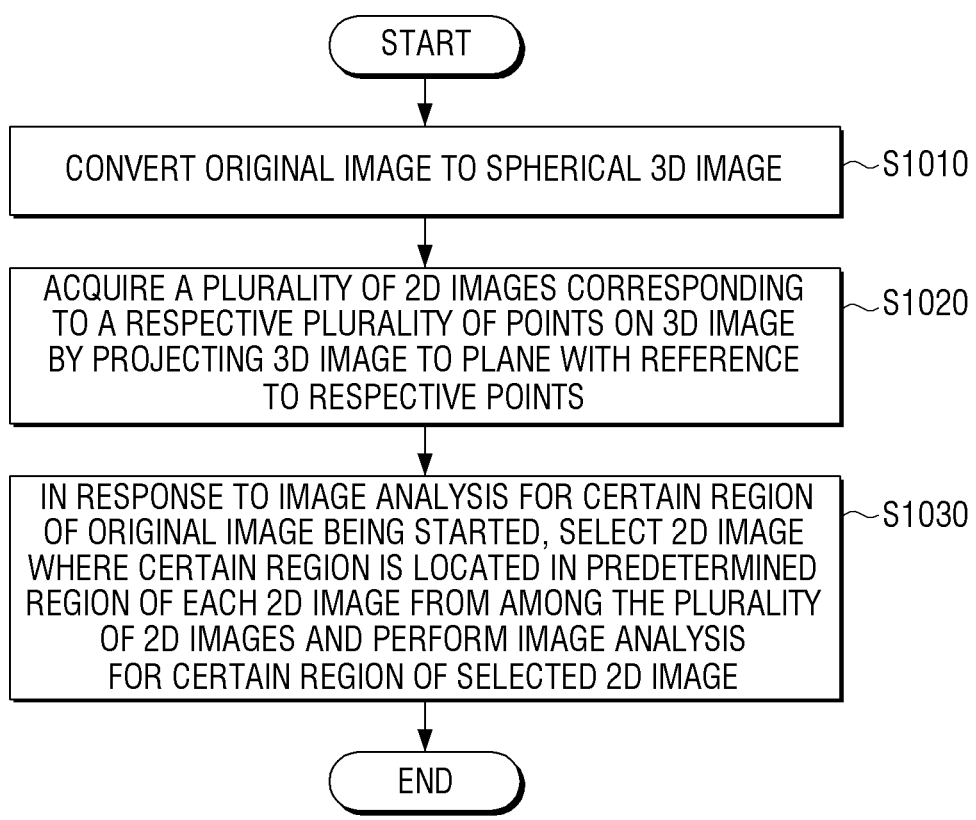

ELECTRONIC APPARATUS AND METHOD FOR PROCESSING IMAGE THEREOF

CROSS-REFERENCE TO RELATED APPLICATION

This application is based on and claims priority under 35 U.S.C. § 119 to Korean Patent Application No. 10-2016-0153965, filed on Nov. 18, 2016, in the Korean Intellectual Property Office, the disclosure of which is incorporated by reference herein in its entirety.

BACKGROUND

1. Field

The present disclosure relates generally to an electronic apparatus and a method for processing an image thereof, and for example, to an electronic apparatus that processes a spherical image and a method for processing an image thereof.

2. Description of Related Art

With the increasing interest in Virtual Realty (VR), various types of 360-degree photographing apparatuses for personal use have been developed and came on the market. Further, it is expected that the 360-degree photographing apparatus will be applied to an omni-directional Closed Circuit Television (CCTV), a black box, and so on.

As 360-degree images are produced in diverse fields, there is a growing necessity for analyzing the images. As an example, in a CCTV or a black box, it is necessary to detect an event or detect and track an object. As another example, various kinds of apparatuses, such as, a Head Mounted Device (HMD), a personal computer (PC), or a television (TV), provide a function for a user to enjoy 360-degree contents. In this case, image analysis is required to provide auto-movement of viewpoint.

There are diverse methods for detecting a feature, extracting a feature point, applying an image filter, detecting an object, or tracking an object, but such methods have been developed only for the conventional image and are still inadequate to process a planar image generated by projecting a 360-degree image.

By way of example, an equirectangular image is generated by projecting a surface of a sphere in an equirectangular manner. The equirectangular image is characterized in that its shape is more distorted towards both poles, and the poles are extended in a widthwise direction of the image. Accordingly, an image analyzing method for a general image is not suitable for the equirectangular image, and the performance may be degraded due to distortion of the equirectangular image.

Further, in the 360-degree image, edge parts of the image are cut off unavoidably as a sphere is spread out to a plane. That is, in the equirectangular image, an object on a left edge part and an object on a right edge part are connected originally, and it is difficult to detect a feature or an object from the disconnected part.

Accordingly, there are efforts to seek a method for improving performance of analyzing and processing a 360-degree image.

SUMMARY

The present disclosure addresses the aforementioned and other problems and disadvantages occurring in the related art, and an example aspect of the present disclosure provides an electronic apparatus for processing a spherical image without (and/or reducing) distortion and a method for processing an image thereof.

According to an example embodiment of the present disclosure, an electronic apparatus is provided. The apparatus includes a storage and a processor configured to convert an original image to a spherical image, to acquire a plurality of two-dimensional (2D) images corresponding to a respective plurality of points on the spherical image by projecting the spherical image onto a plane with reference to the respective plurality of points on the spherical image, and to store the acquired 2D images in the storage.

The processor may acquire a plurality of 2D images corresponding to one or more points among the plurality of points by projecting the spherical image in a plurality of different directions at the one or more points.

In response to image analysis for a certain region of the original image being started, the processor may select a 2D image where the certain region is located in a predetermined region of each 2D image from among the plurality of 2D images and perform the image analysis for the certain region in the selected 2D image.

The processor may divide the spherical image to a plurality of regions, determine the points for the respective plurality of regions, and acquire the plurality of 2D images by projecting a corresponding region of the spherical image to the plane for each of the determined points.

The processor may extend the respective plurality of regions to overlap each other and acquire the plurality of 2D images by projecting the respective extended regions of the spherical image to the plane for each of the determined points.

In response to image processing for an overlapped region in the plurality of 2D images being performed and the plurality of 2D images being reconstructed to a new original image, the processor may reconstruct the new original image using at least one of an average value, a median value, a maximum value, and a minimum value of pixels corresponding to each other in the overlapped region.

The processor may determine a plurality of additional regions including boundaries of the plurality of regions, determine additional points for the respective plurality of additional regions, and acquire a plurality of additional 2D images by projecting a corresponding additional region of the spherical image to the plane with reference to the determined additional points.

The processor may divide the spherical image to a plurality of new regions based on a new criterion different from a criterion for dividing the plurality of regions, determine the points for the respective plurality of new regions, acquire a plurality of new 2D images by projecting a corresponding region of the spherical image to the plane for each of the determined points, and perform the image analysis using the plurality of 2D image and the plurality of new 2D images.

The processor may add a certain region of a 2D image among the plurality of 2D images to a certain side of the 2D image and change the 2D image.

The storage may store an original video including a plurality of successive original images. The processor may be configured to convert the plurality of original images to spherical images respectively, and in response to a random object being detected from a first spherical image which is one of the converted spherical images, to acquire a first second-dimensional (2D) image by projecting the first spherical image to the plane with reference to a first point where the object was detected. Further, the processor may detect the object from a second spherical image subsequent to the first spherical image, in response to a distance between the first point and a second point where the object was detected being longer than a predetermined distance, acquire a second two-dimensional (2D) image by projecting the second spherical image to the plane with reference to the second point, and in response to the distance between the first point and the second point being shorter than the predetermined distance, acquire the second 2D image by projecting the second spherical image to the plane with reference to the first point.

The apparatus may further include a display. The processor may control the display to display a predetermined first region of one of the plurality of 2D images, detect a 2D image where a predetermined object is located in a predetermined second region of each 2D image from among the plurality of 2D images, and store information on the detected 2D image in the storage.

According to an example embodiment of the present disclosure, a method for processing an image of an electronic apparatus is provided. The method includes converting an original image to a spherical image, acquiring a plurality of two-dimensional (2D) images corresponding to a respective plurality of points on the spherical image by projecting the spherical image onto a plane with reference to the respective plurality of points on the spherical image, and selecting, in response to image analysis for a certain region of the original image being started, a 2D image where the certain region is located in a predetermined region of each 2D image from among the plurality of 2D images and performing the image analysis for the certain region in the selected 2D image.

The acquiring may include acquiring a plurality of 2D images corresponding to one or more points among the plurality of points by projecting the spherical image in a plurality of different directions at the one or more points.

The acquiring may include dividing the spherical image to a plurality of regions, determining the points for the respective plurality of regions, and acquiring the plurality of 2D images by projecting a corresponding region of the spherical image to the plane for each of the determined points.

The acquiring may include extending the respective plurality of regions to overlap each other and acquiring the plurality of 2D images by projecting the respective extended regions of the spherical image to the plane for each of the determined points.

The method may further include performing image processing for an overlapped region in the plurality of 2D images and reconstructing, in response to the plurality of 2D images being reconstructed to a new original image, the new original image using at least one of an average value, a median value, a maximum value, and a minimum value of pixels corresponding to each other in the overlapped region.

The acquiring may include determining a plurality of additional regions including boundaries of the plurality of regions, determining additional points for the respective plurality of additional regions, and acquiring a plurality of additional 2D images by projecting a corresponding additional region of the spherical image to the plane with reference to the determined additional points.

The acquiring may include dividing the spherical image to a plurality of new regions based on a new criterion different from a criterion for dividing the plurality of regions, determining the points for the respective plurality of new regions, and acquiring a plurality of new 2D images by projecting a corresponding region of the spherical image to the plane for each of the determined points. The performing the image analysis may include performing the image analysis using the plurality of 2D images and the plurality of new 2D images.

The method may further include adding a certain region of a 2D image among the plurality of 2D images to a certain side of the 2D image and changing the 2D image.

The converting may include converting a plurality of successive original images of an original video to spherical images, respectively. In response to a random object being detected from a first spherical image which is one of the converted spherical images, the acquiring may include acquiring a first two-dimensional (2D) image by projecting the first spherical image to the plane with reference to a first point from which the object was detected. Further, the acquiring may include detecting the object from a second spherical image subsequent to the first spherical image, in response to a distance between the first point and a second point from which the object was detected being longer than a predetermined distance, acquiring a second two-dimensional (2D) image by projecting the second spherical image to the plane with reference to the second point, and in response to the distance between the first point and the second point being shorter than the predetermined distance, acquiring the second 2D image by projecting the second spherical image to the plane with reference to the first point.

According to the above-described various example embodiments of the present disclosure, the electronic apparatus may acquire a plurality of 2D images from a spherical image and analyze the plurality of 2D images thereby minimizing and/or reducing distortion that may occur while analyzing the spherical image.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 5 is a diagram illustrating an example method for analyzing a bounded region of a 2D image according to an example embodiment of the present disclosure;

FIG. 6 is a diagram illustrating an example method for tracking an object according to an example embodiment of the present disclosure;

FIG. 8 is a diagram illustrating an example method for changing an image processing method according to an example embodiment of the present disclosure;

FIG. 10 is a flowchart illustrating an example method for processing an image of an electronic apparatus according to an example embodiment of the present disclosure.

DETAILED DESCRIPTION

Figure 1:
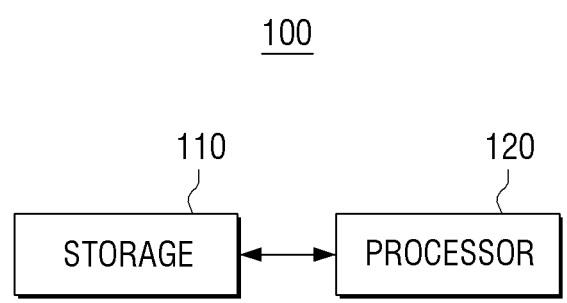
FIG. 1 is a block diagram illustrating an example structure of an electronic apparatus according to an example embodiment of the present disclosure.

Various example embodiments are described below in greater detail with reference to the accompanying drawings. In the following disclosure, like drawing reference numerals are used for the like elements, even in different drawings. The matters defined in the disclosure, such as detailed construction and elements, are provided to assist in a comprehensive understanding of embodiments. However, various embodiments can be practiced without those specifically defined matters. Also, well-known functions or constructions may not described in detail where they would obscure the application with unnecessary detail.

FIG. 1 is a block diagram illustrating an example structure of an electronic apparatus 100 according to an example embodiment of the present disclosure.

As illustrated in FIG. 1, the electronic apparatus 100 includes a storage 110 and a processor (e.g., including processing circuitry) 120.

The electronic apparatus 100 may be an apparatus which analyzes and processes an image or a video. For example, the electronic apparatus 100 may be realized as, for example, and without limitation, a laptop PC, a desktop PC, a smart phone, or the like. The electronic apparatus 100 may be realized as any kind of apparatus capable of analyzing and processing an image or a video.

For example, the electronic apparatus 100 may be an apparatus which analyzes and processes an original image. In this case, the original image may be a Virtual Reality (VR) image generated by converting a plurality of images photographed in a plurality of different viewpoints to a plane.

In other words, the original image may be an image generated by photographing a plurality of images so as to include all directions with reference to a photographing person, stitching the plurality of photographed images, and converting the stitched images to a plane, but not limited thereto. The original image may be an image generated by photographing a plurality of images so as to include only some of the directions. Further, the original image may be generated by photographing one image with a fisheye lens.

The original image may be a kind of 2D image described below, but in the following description, the original image will be distinguished from a 2D image for convenience in explanation.

A spherical image may be generated by stitching the plurality of images photographed in the plurality of different viewpoints. In other words, the spherical image may be a 360-degree image or a spherical 360-degree image.

Figure 2A:
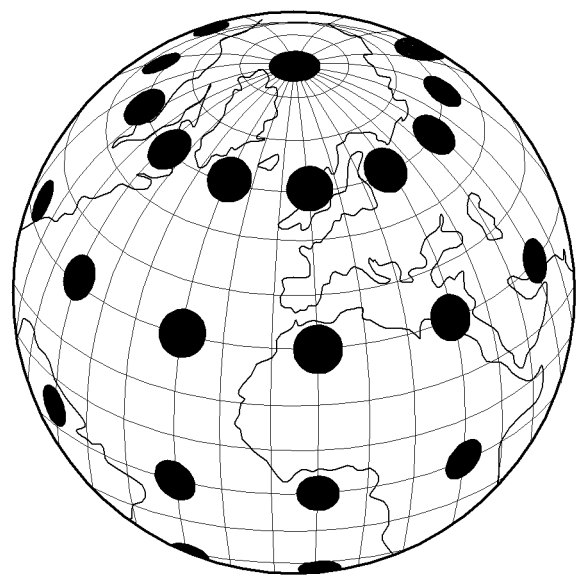
FIGS. 2A, 2B and 2C are diagrams illustrating an example spherical image for better understanding of the present disclosure.
Figure 2B:
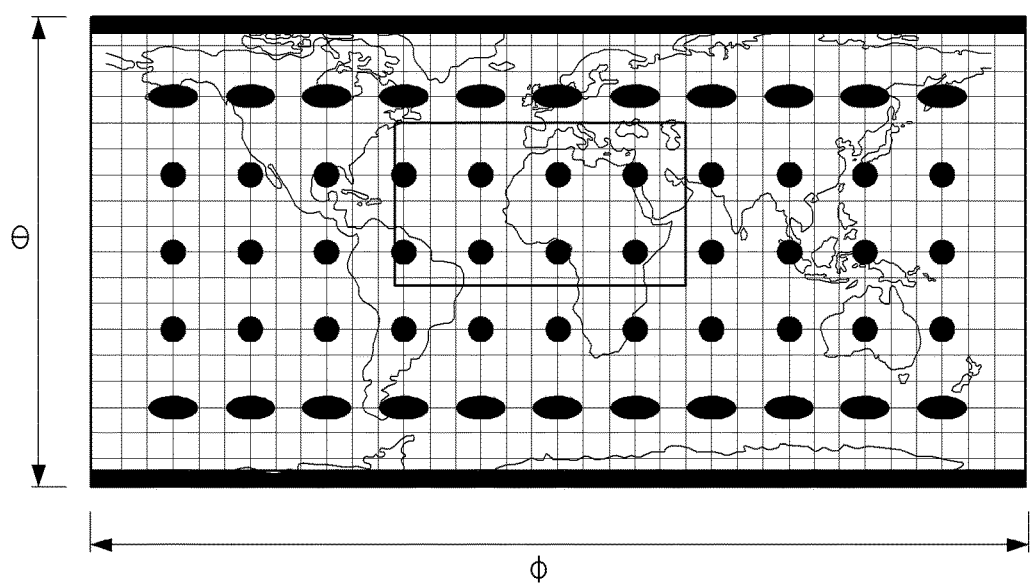

FIG. 2A is a diagram illustrating an example of the spherical image. Further, a 2D image may be generated by converting the spherical image of FIG. 2A according to an equirectangular projection method. FIG. 2B is a diagram illustrating an example of the 2D image. In this case, an operation of converting a spherical image to a 2D image may be referred to as, for example, a 'projection,' and the method may be referred to as, for example, a 'projection method.'

FIG. 2B is a diagram illustrating an example of converting a spherical image to a 2D image according to the equirectangular projection method, but is not limited thereto. By way of example, a spherical image may be converted to a 2D image through diverse projection methods, such as, rectilinear, cylindrical, mercator, stereographic, pannini, and so on.

In the spherical image of FIG. 2A, a shape of round spots may be changed as the spherical image is projected to a plane. That is, the round spots of FIG. 2A may be changed to be oval in shape towards upper and lower sides of the 2D image of FIG. 2B. This distortion occurs as the spherical image is displayed as a rectangular planar image and may become more intense towards the upper and lower sides of the image of FIG. 2B.

However, a distorted region may be changed depending on a projection method. In the following description, only the equirectangular projection method will be described for convenience of explanation, but the present disclosure may be applied to other projection methods.

Figure 2C:
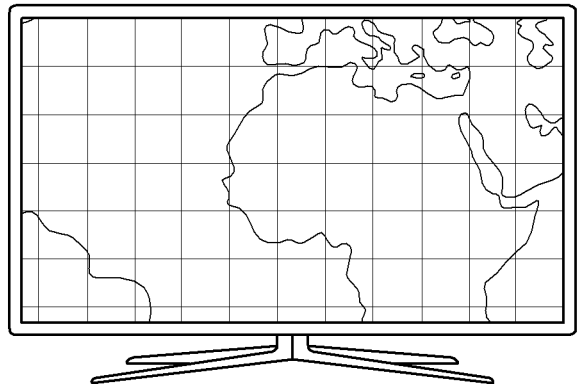

The electronic apparatus 100 may include a display and display a certain region of a 2D image through the display as illustrated, for example, and without limitation, in FIG. 2C. For example, the electronic apparatus 100 may display a center region of a 2D image generated according to the equirectangular projection method.

For example, the electronic apparatus 100 may acquire a 2D image by projecting a spherical image to a plane at a certain point of the spherical image in a certain direction. In this case, the certain point refers to a projection viewpoint. The electronic apparatus 100 may display a region by an amount of a predetermined projection angle with reference to the projection viewpoint of the 2D image.

In this case, the projection angle may be an angle with respect to a region that a user wants to display on a center of the spherical image. When the region that the user wants to display is a rectangular region, the projection angle may include an angle formed by upper and lower edges of the rectangular region and the center of the spherical image and an angle formed by left and right edges of the rectangular region and the center of the spherical image.

However, the above example is not limited thereto. The electronic apparatus 100 may receive only one of the above-described two angles and determine the region that the user wants to display. For example, in response to receiving the angle formed by the left and right edges of the region that the user wants to display and the center of the spherical image, the electronic apparatus 100 may determine the region that the user wants to display based on an aspect ratio of the display.

Further, the electronic apparatus 100 may project only a part of region of the spherical image to the plane based on the projection viewpoint and the projection angle and acquire a 2D image. In this case, the electronic apparatus 100 may display the entire 2D image.

As described above, the electronic apparatus 100 may display a part of region where the distortion is minimized and/or reduced in the 2D image. Accordingly, in response to the projection viewpoint being set inaccurately, the user may view only an unimportant image. By way of example, the electronic apparatus 100 may display a region including only a background without displaying a region including a leading character of a drama.

The electronic apparatus 100 may analyze each image in order to address this problem. A detailed description on this operation will be provided below.

The storage 110 may store an original image under control of the processor 120. The original image may be an image generated in an external apparatus, not the electronic apparatus 100. In this case, the electronic apparatus 100 may receive the original image from the external apparatus and store the received original image in the storage 110. Further, the electronic apparatus 100 may include at least one camera. In this case, the electronic apparatus 100 may perform a photographing operation using the at least one camera and generate an original image by processing at least one photographed image.

The processor 120 may analyze the original image. For example, the processor 120 may perform at least one of the image analysis operations, such as, for example, and without limitation, extracting a feature independent from adjacent pixels, extracting a feature by considering adjacent pixels, performing calculation using pixel location information, detecting an object, and tracking of an object, with respect to the original image, or the like, but is not limited thereto. That is, the processor 120 may perform other image processing operations of any kind. Further, the processor 120 may analyze a video in the same manner.

The processor 120 may minimize and/or reduce an effect by the distorted region and process the original image. The effect by the distorted region may be minimized and/or reduced by two methods.

According to one method, the processor 120 may convert an original image itself to minimize and/or reduce the effect by the distorted region. For example, the processor 120 may convert the original image to a spherical image and project the spherical image to the plane with reference to a plurality of points on the spherical image to acquire a plurality of 2D images corresponding to the respective points. The processor 120 may minimize and/or reduce the effect by the distorted region and analyze the image using the plurality of 2D images.

According to the other method, the processor 120 may change the image processing method to minimize and/or reduce the effect by the distorted region in the original image. For example, the processor 120 may use a filter, and in this case, the processor 120 may change the filter based on a region to which the filter will be applied in the original image and apply the changed filter to the original image.

As described above, the electronic apparatus 100 may minimize and/or reduce the effect by the distorted region in the original image and analyze or process the original image. Hereinafter, example Embodiment 1 illustrates a non-limiting example of converting an original image itself to minimize and/or reduce the effect by the distorted region, and example Embodiment 2 will provide a non-limiting example of changing an image processing method to minimize and/or reduce the effect by the distorted region.

<Example Embodiment 1—Converting an Original Image>

FIGS. 3A, 3B, 3C and 3D are diagrams illustrating an example of converting an original image itself according to an example embodiment of the present disclosure.

Figure 3A:
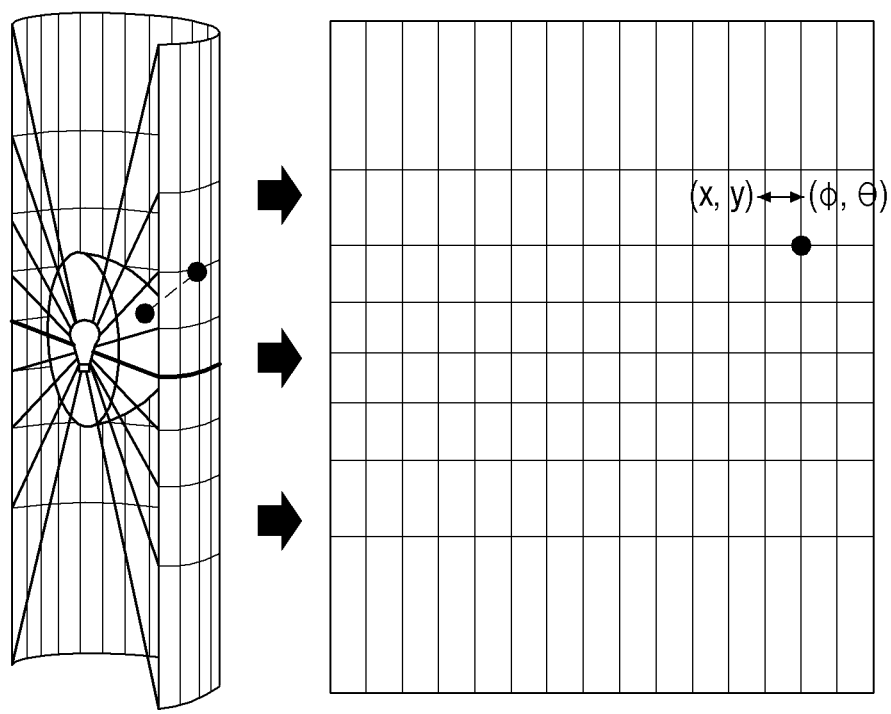
FIGS. 3A, 3B, 3C and 3D are diagrams illustrating an example of converting an original image itself according to an example embodiment of the present disclosure.

As illustrated in FIG. 3A, the processor 120 may convert an original image in the storage 110 to a spherical image. As illustrated in the original image of FIG. 2B, a width of the original image may correspond to Y of a spherical coordinate system, and a length of the original image may correspond to θ of the spherical coordinate system. That is, the processor 120 may convert the original image to the spherical image according to a method for converting a coordinate system. This method is publicly known, and a detailed description will be omitted.

The processor 120 may project the spherical image to the plane with reference to a respective plurality of points on the spherical image, acquire a plurality of 2D images corresponding the respective points, and store the acquired 2D images in the storage 110.

Figure 3B:
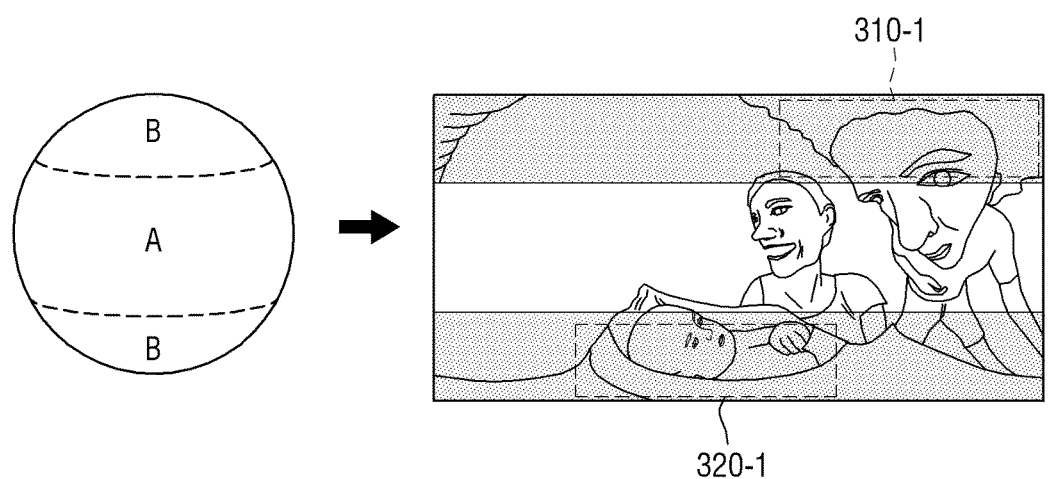

As an example, as illustrated in FIG. 3B, the processor 120 may project the spherical image to the plane with reference to a first point on the spherical image and acquire a 2D image corresponding to the first point. Further, the processor 120 may project the spherical image to the plane with reference to a second point on the spherical image and acquire a 2D image corresponding to the second point.

The processor 120 may spread the spherical image in a plurality of different directions at one or more points among the plurality of points and acquire a plurality of 2D images corresponding to the one or more points.

For example, as illustrated in FIG. 3B, the processor 120 may project the spherical image in a horizontal direction with reference to the first point on the spherical image and acquire a 2D image. In this case, Region B on the spherical image may be distorted, and distortion in Region A may be minimal and/or reduced.

Figure 3C:
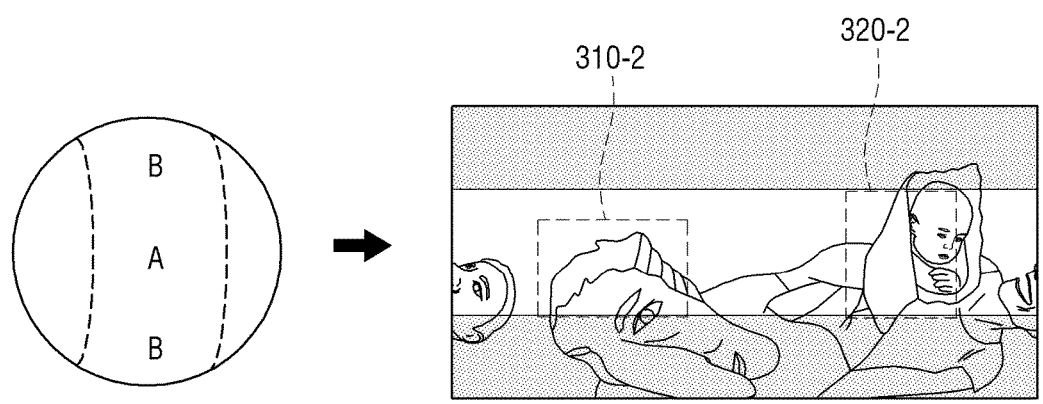

Further, as illustrated in FIG. 3C, the processor 120 may project the spherical image in a vertical direction with reference to the first point on the spherical image and acquire a 2D image. In this case, a distorted region on the spherical image may be changed.

Referring to FIGS. 3B and 3C, shaded parts in the 2D image are regions where the distortion occurred, and the other region is a region where the distortion is minimal and/or reduced (e.g., the least-distorted region). In this case, the least-distorted region refers to a region where little distortion occurred and may be a region within a predetermined distance from a center horizontal line of the 2D image. In this case, the predetermined distance may be determined by the user. In case of a 2D image generated according to other projection method, the least-distorted region may be changed.

Referring to FIG. 3B, the distorted regions 310-1, 320-1 of the 2D image are located in the least-distorted regions 310-2, 320-2 of the 2D image of FIG. 3C. That is, the processor 120 may change a region where the distortion occurs by changing at least one of the projection viewpoint and a projection direction of projecting the spherical image to the plane.

Figure 3D:

As illustrated in FIG. 3D, the processor 120 may analyze or process the original image using only the least-distorted region (a unshaded region) in the 2D image of FIG. 3B and FIG. 3C. In this case, the processor 120 may determine the least-distorted region to be analyzed or processed in the original image based on the projection method.

Further, in response to image analysis for a certain region in the original image being started, the processor 120 may select a 2D image where the certain region is located in a predetermined region in each 2D image from among the plurality of 2D images and perform the image analysis with respect to the certain region in the selected 2D image.

In FIGS. 3B and 3C, the processor 120 changes at least one of the projection viewpoint and the projection direction of projecting the spherical image to the plane in the spherical image, but this is an example for convenience of explanation, and the operation of the processor 120 is not limited thereto.

For example, the processor 120 may rotate the spherical image to at least one angle among a roll angle, an azimuth, and a pitch angle of the spherical image of FIG. 3B and convert the rotated spherical image to a 2D image. In this case, the roll angle refers, for example, to an angle where a horizontal plane is tilted in a horizontal direction, the azimuth refers, for example, to an angle where a horizontal plane is changed in a horizontal direction, and the pitch angle refers, for example, to an angle where a horizontal plane is tilted in a vertical direction.

For example, the processor 120 may rotate the spherical image of FIG. 3B to the angles of the azimuth 90° and the pitch angle 90° and convert the rotated spherical image to a 2D image. In this case, the processor 120 may generate a 2D image which is the same as the 2D image of FIG. 3C.

FIGS. 4A, 4B, 4C and 4D are diagrams illustrating an example of converting an original image itself according to another example embodiment of the present disclosure.

Figure 4A:
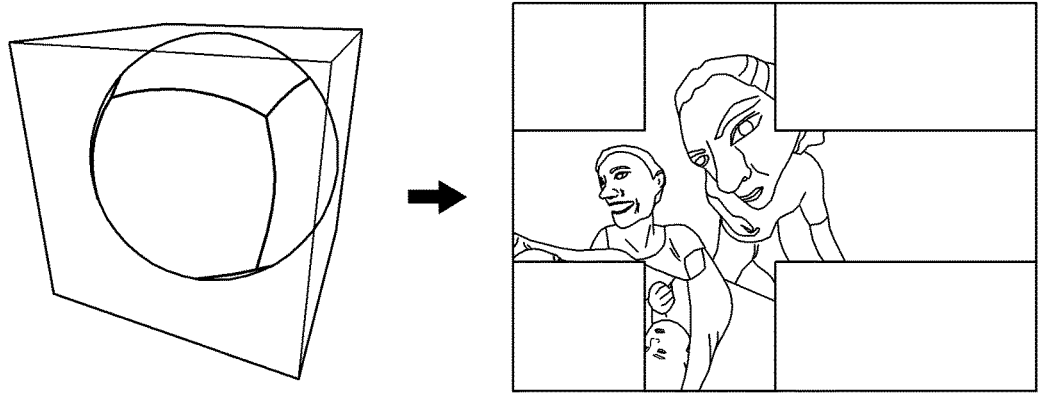
FIGS. 4A, 4B, 4C and 4D are diagrams illustrating an example of converting an original image itself according to another example embodiment of the present disclosure.

As illustrated in FIG. 4A, the processor 120 may divide a spherical image to a plurality of regions. For example, the processor 120 may divide the spherical image to six regions of the same size so that the respective divided regions correspond to each surface of a cube.

However, the above embodiment is not limited thereto. That is, the processor 120 may divide the spherical image to any number of and any form of regions. For example, the processor 120 may divide the spherical image to a plurality of regions by considering at least one of an operation quantity and an operation time.

Further, the processor 120 may determine a point for the respective plurality of regions. Each point may be located in a corresponding region and refer to a projection viewpoint. Particularly, the processor 120 may determine a center point of each region as a point so as to minimize and/or reduce the distortion, but not limited thereto. That is, the processor 120 may determine other position than the center point of each region as the point.

The processor 120 may project a corresponding region of the spherical image to the plane for each of the determined points and acquire a plurality of 2D images. That is, the processor 120 may project each of the plurality of regions with reference to a corresponding point and acquire the plurality of 2D images.

As described above, the processor 120 may use diverse projection methods and determine the projection method by considering at least one of a distortion degree and connectivity with an adjacent region of the projection method.

A 2D image corresponds to a certain region of a spherical image, and one 2D image does not correspond to the entire spherical image. That is, differently from FIGS. 3A to 3D, the processor 120 may generate one 2D image by projecting a certain region of the spherical image and repeat this operation to generate a plurality of 2D images corresponding to the entire regions of the spherical image.

The right drawing of FIG. 4A illustrates an image where a plurality of 2D images are connected, and the entire regions may be the least-distorted region in this case. Accordingly, the processor 120 may process the image by minimizing and/or reducing the effect by the distorted region.

As illustrated in the right drawing of FIG. 4A, the processor 120 may analyze or process the image where a plurality of 2D images are connected. Further, the processor 120 may analyze or process the plurality of 2D images separately without connecting the 2D images.

However, when the processor 120 analyzes or processes the spherical images as illustrated in FIG. 4A, a bounded portion between the plurality of spherical images may be analyzed or processed incorrectly. For example, when a human's face is located in a bounded portion between a first two-dimensional (2D) image and a second two-dimensional (2D) image, a part of the face may be included in the first 2D image, and the other part of the face may be included in the second 2D image. In this case, the processor 120 may not detect the human's face.

Figure 4B:
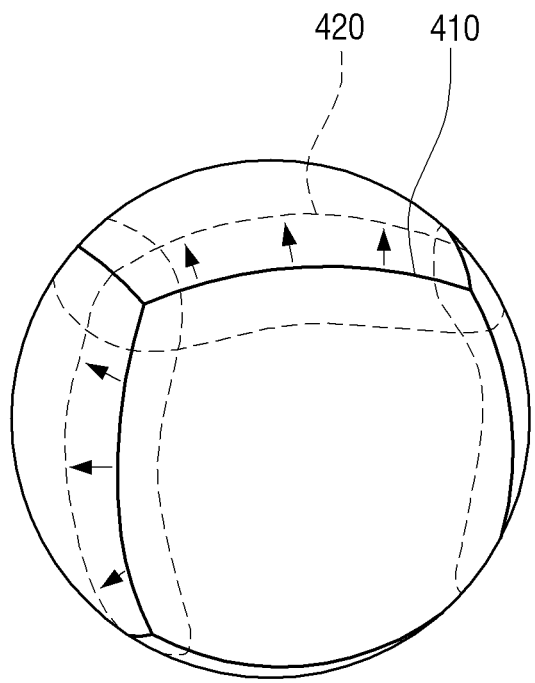

Accordingly, as illustrated in FIG. 4B, the processor 120 may extend the respective regions to overlap each other. Subsequently, the processor 120 may project the extended region of the spherical image to the plane for each of the determined points and acquire a plurality of 2D images. In this case, the points may be determined in the same manner as described in FIG. 4A.

For example, the processor 120 may project an extended front region 420 generated by extending a front region 410 among the plurality of regions to the plane with reference to a corresponding point and acquire the 2D image.

In this case, the corresponding point may be a point determined with reference to the front region 410. Further, the processor 120 may determine a new point as the front region 410 is extended. That is, the processor 120 may determine a new point based on the extended front region 420.

The processor 120 may extend the other regions among the plurality of regions in the same manner as in the front region 410. The processor 120 may project the image to the plane for the respective plurality of extended regions with reference to the corresponding point and acquire a plurality of remaining 2D images. The processor 120 may perform the image analysis or image processing using the plurality of 2D images.

However, in response to respectively extending the plurality of regions, an overlapped region may be generated. In this case, the processor 120 may process the plurality of 2D images separately without connecting the 2D images, and any problem may do not occur in this case. However, in response to reconverting the plurality of 2D images to a corresponding region of the spherical image or connecting and processing the 2D images, a problem may occur.

That is, the processor 120 may image-process the plurality of 2D images and then reconvert the 2D images to a corresponding region of the spherical image. In this case, as the overlapped region is converted to a corresponding region of the spherical image, a plurality of pixel values with the same coordinate may be generated. The same pixel values does not cause any problem, but the different pixel values may cause a problem of which pixel value is used to form the spherical image.

Further, when the processor 120 connects the plurality of 2D images, there are a plurality of pixel values in the overlapped region, and thus, a problem of which pixel value is used may occur.

Accordingly, in response to the image analysis or image processing for the overlapped region being performed in the plurality of 2D images and then receiving an analysis result value from the plurality of 2D images or the 2D images being reconstructed to a new original image, the processor 120 may process the analysis result value or reconstruct the new original image using at least one of an average value, a median value, a maximum value, and a minimum value of the pixels corresponding to each other in the overlapped region.

By way of example, in response to converting each of the first 2D image and the second 2D image to a corresponding region of a spherical image, the first 2D image and the second 2D image may form a first partial region and a second partial region of the spherical image, respectively. The first partial region and the second partial region may have an overlapped region.

In response to a plurality of pixel values with respect to (Y, θ) being present in the overlapped region, the processor 120 may determine a value with respect to (Y, θ) using at least one of an average value, a median value, a maximum value, and a minimum value of the plurality of pixel values.

Further, the processor 120 may process the overlapped region in different manners for the respective cases of analyzing the plurality of 2D images and processing the plurality of 2D images.

For example, in response to performing an image processing operation, such as, smoothing, with respect to the plurality of 2D images, the processor 120 may use at least one of the average value, the median value, the maximum value, and the minimum value of the plurality of pixel values, as described above.

In response to performing an image analysis operation, such as, gradient, with respect to the plurality of 2D images, the processor 120 may do not use the average value, the median value, the maximum value, or the minimum value of the plurality of pixel values. In this case, the processor 120 may use the analysis result itself without displaying the overlapped region. Further, the processor 120 may display an analysis result of each 2D image separately.

Figure 4C:
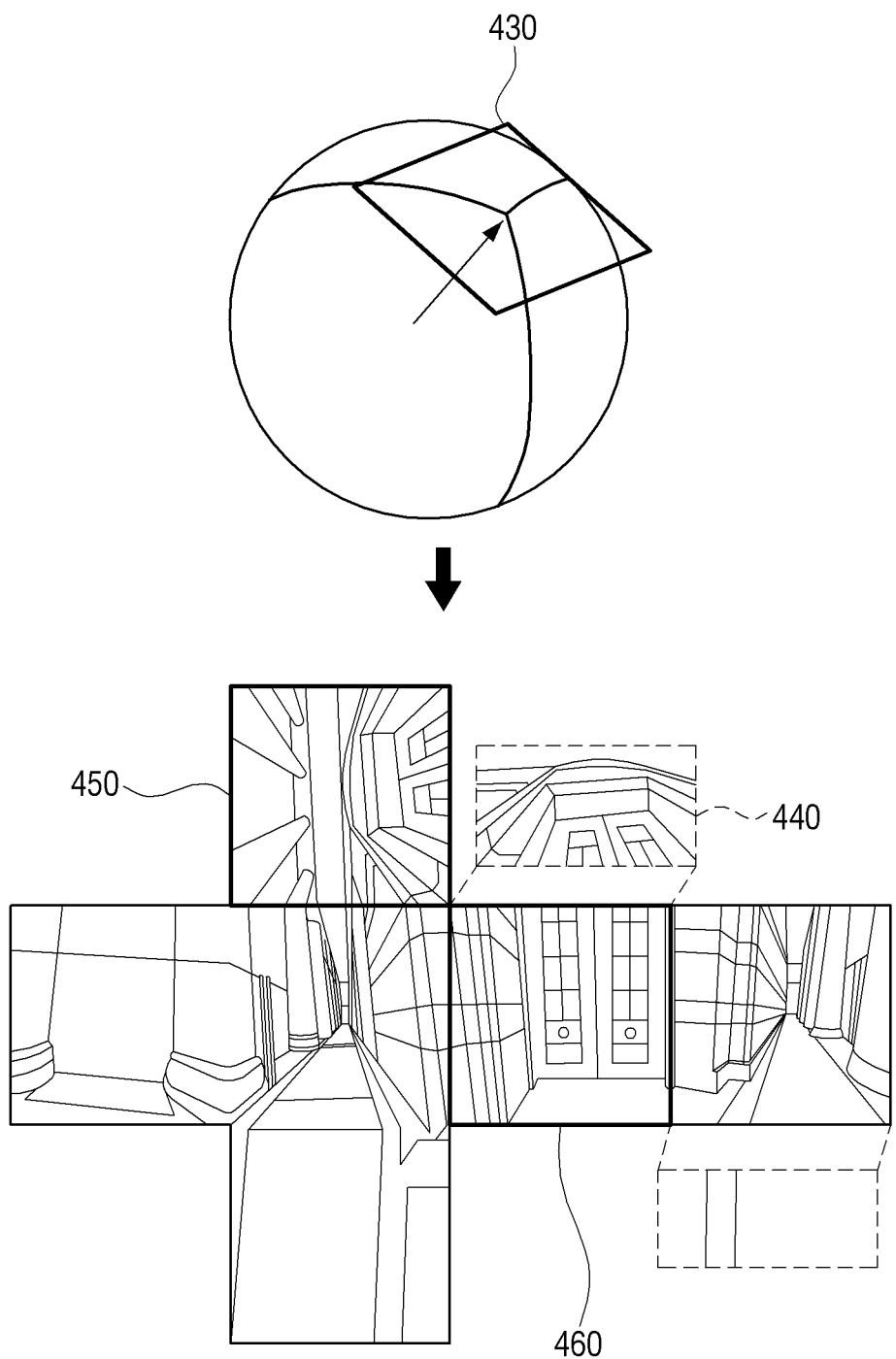

As illustrated in FIG. 4C, the processor 120 may determine a plurality of additional regions including boundaries of the plurality of regions, determine additional points for the respective additional regions, and acquire a plurality of additional 2D images by projecting a corresponding region of the spherical image to the plane with reference to the determined additional points. In this case, the additional points may be determined in the same manner as in FIG. 4A.

As described above, it may be difficult to analyze or process a bounded region. However, as illustrated in FIG. 4C, the processor 120 may acquire an additional 2D image 440 with respect to an additional region 430 including the bounded region and perform the image analysis or image processing to the bounded region. In this case, the additional 2D image 440 may include some region of the 2D image 450, 460 generated in FIG. 4A.

Figure 4D:
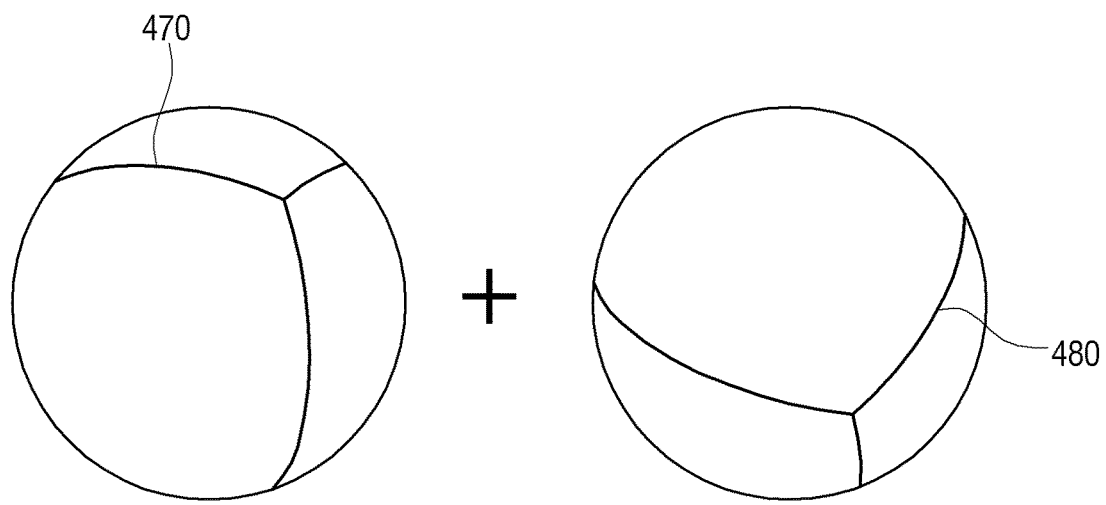

Further, as illustrated in FIG. 4D, the processor 120 may divide the spherical image to a plurality of new regions based on a new criterion different from the criterion for dividing the plurality of regions.

The processor 120 may determine the points for the respective plurality of new regions, acquire a plurality of new 2D images by projecting a corresponding region of the spherical image to the plane for each of the determined points, and perform the image analysis or image processing using the plurality of previous 2D images and the plurality of new 2D images.

As an example, the processor 120 may divide the plurality of regions along a first boundary line 470 and acquire the plurality of 2D images. Subsequently, the processor 120 may divide the plurality of regions along a second boundary line 480 and acquire the plurality of new 2D images. In this case, the first boundary line 470 and the second boundary line 480 may be set to not overlap each other.

As illustrated in FIG. 4C or FIG. 4D, the processor 120 may generate the plurality of 2D images. In response to the image processing being performed for the overlapped region in the plurality of 2D images and then the plurality of 2D images being reconstructed to a new original image, the processor 120 may reconstruct the new original image using at least one of the average value, the median value, the maximum value, and the minimum value of the pixels corresponding to each other in the overlapped region.

The processor 120 may minimize and/or recude the effect by the distortion and perform the image analysis or image processing through the operation of FIG. 4A. Further, the processor may eliminate and/or reduce an error which may occur in the bounded region while analyzing or processing an image through the operation of FIGS. 4B to 4D.

FIG. 5 is a diagram illustrating an example method for analyzing a bounded region of a 2D image according to an example embodiment of the present disclosure.

As described above, the image analysis or image processing for a bounded portion may be inaccurate. By way of example, in response to each of a left bounded portion 510-1 and a right bounded portion 510-2 being divided to a left side and a right side of the 2D image as illustrated in the upper drawing of FIG. 5, the processor 120 may not detect a human figure in the bounded portions.

Accordingly, the processor 120 may add a certain region of one of the plurality of 2D images to a certain side of the 2D image and change the 2D image.

For example, as illustrated in the right drawing of FIG. 5, the processor 120 may copy a left region 520-1 of the 2D image and add a copied region 520-2 to the right side. In this case, the processor 120 may detect a human FIG. 510.

In this case, a size of the left region 520-1 of the 2D image may be changed without limit. Further, in FIG. 5, the 2D image is extended in a horizontal direction, but not limited thereto. To be specific, the processor 120 may extend the 2D image in a vertical direction or in every direction.

In response to the image processing being performed with respect to the region extended in the 2D image and then the 2D image being reconstructed to a new original image as illustrated in FIG. 5, the processor 120 may reconstruct the new original image using at least one of an average value, a median value, a maximum value, and a minimum value of the pixels corresponding to each other in the extended region.

FIG. 6 is a diagram illustrating an example method for tracking an object according to an example embodiment of the present disclosure.

In this case, the storage 110 may store an original video including a plurality of successive original images according to control of the processor 120. The first to third drawings of FIG. 6 illustrate successive three images of the original video.

The processor 120 may convert the plurality of original images to spherical images, respectively. In response to detecting a random object 610 from a first spherical image which is one of the converted spherical images, the processor 120 may project the first spherical image to the plane with reference to a first point where the object 610 was detected and acquire a first 2D image 620.

In this case, the first 2D image may be the first drawing of FIG. 6. The object 610 may be designated by the user or may be preset so as to detect a particular object, for example, a human figure.

In the first drawing of FIG. 6, the processor 120 may generate a 2D image by projecting only a part of region 620 to the plane, not the entire first spherical image. In this case, the processor 120 may determine the part of region 620 based on the first point where the object 610 was detected.

The processor 120 may detect the object 610 from a second spherical image which is subsequent to the first spherical image.

In response to a distance between the first point and the second point where the object was detected being shorter than a predetermined distance, the processor 120 may acquire the second 2D image by projecting the second spherical image to the plane with reference to the first point. The second 2D image may be the second drawing of FIG. 6.

Further, in the second drawing of FIG. 6, the processor 120 may generate a 2D image generated by projecting only the part of region 620 to the plane, not the entire second spherical image.

In response to the distance between the first point and the second point being longer than the predetermined distance, the processor 120 may acquire the second 2D image generated by projecting the second spherical image to the plane with reference to the second point.

Further, in the second drawing of FIG. 6, the processor 120 may acquire the second 2D image generated by projecting only a part of region 630 to the plane, not the entire second spherical image.

The third drawing of FIG. 6 illustrates a 2D image where a third spherical image was projected to the plane. In this case, the processor 120 may change at least one of the points and the part of region according to a location of the object in the same manner as in the second drawing of FIG. 6.

In the above embodiment, the point is changed based on the distance between the first point and the second point, but not limited thereto. For example, in response to the object 610 being located in a predetermined region in the part of region 620, the processor 120 may change the point. In FIG. 6, the predetermined region is shaded in the part of region 620, 630, 640. The predetermined region of FIG. 6 is for convenience in explanation and may be changed to any location.

The processor 120 may change at least one of the size of the part of region, a change degree of a projection viewpoint, a projection method, and a projection angle.

Figure 7:
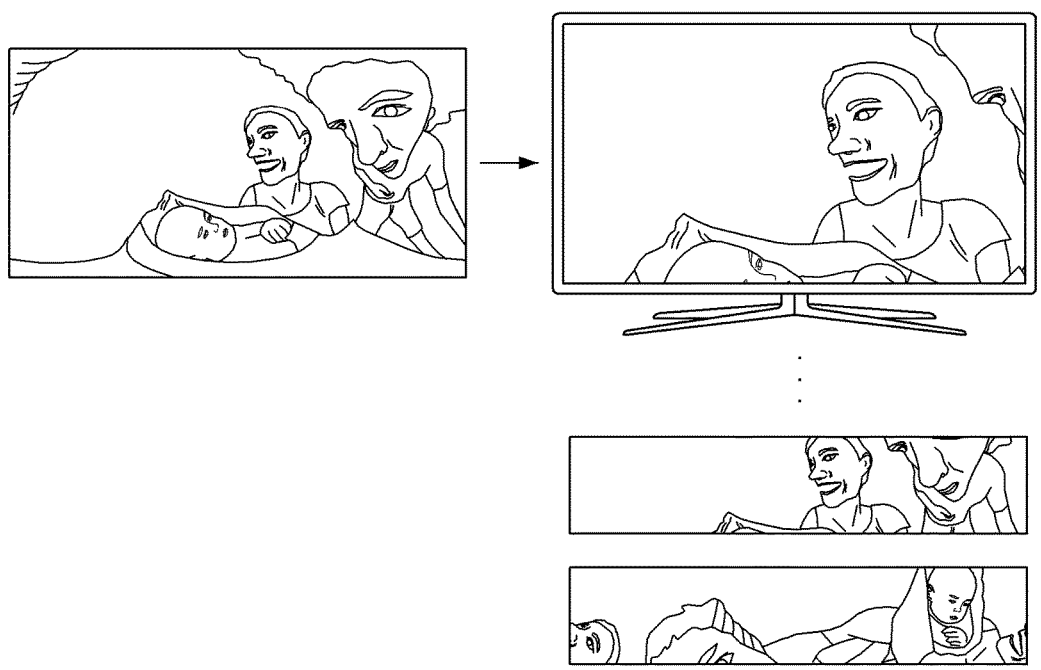
FIG. 7 is a diagram provided illustrating an example operation of an electronic apparatus with respect to a projection viewpoint according to an example embodiment of the present disclosure.

FIG. 7 is a diagram illustrating an example operation of an electronic apparatus 100 with respect to a projection viewpoint according to an example embodiment of the present disclosure.

The left drawing of FIG. 7 illustrates an original image. The processor 120 may convert the original image to a spherical image and acquire a 2D image by projecting the spherical image to the plane. As illustrated in the right drawing of FIG. 7, the processor 120 may display a certain region of the 2D image.

In this case, the processor 120 may determine a region to be displayed from the 2D image based on at least one of a projection viewpoint, a projection direction, a projection angle, and a projection method.

Further, the processor 120 may acquire a plurality of 2D images based on a plurality of projection viewpoints and projection directions. As illustrated in the lower drawing of FIG. 7, the processor 120 may store only the least-distorted region from the plurality of 2D images in the storage 110. The region stored in the storage 110 may be not displayed.

The processor 120 may analyze a certain region of the plurality of 2D images in the storage 110 and detect a predetermined object. For example, the processor 120 may detect a human figure from a certain region of the 2D images and store the 2D image where the human figure was detected in the storage 110. Further, the processor 120 may store at least one of the projection viewpoint, the projection direction, the projection angle, and the projection method of the certain region of the 2D image where the human figure was detected in the storage 110.

The processor 120 may analyze an original image or a spherical image, determine the projection viewpoint, the projection direction, the projection angle, or the projection method, and store determined information in the storage 110.

For example, the processor 120 may detect a predetermined object from the spherical image and determine the projection viewpoint, the projection direction, the projection angle, and the projection method so that the detected object is included.

The processor 120 may provide the user with information on the projection viewpoint and so on based on the information in the storage 110. For example, in the state as illustrated in the right drawing of FIG. 7, the processor 120 may provide the user with the projection viewpoint information on a human figure. In this case, in response to receiving a user input of selecting the projection viewpoint, the processor 120 may display a certain region of the 2D image so as to correspond to the projection viewpoint.

This operation may be performed for a video in the same manner. As an example, the processor 120 may store information on a plurality of projection viewpoints for each frame while displaying the video. In response to the video being played back by the user, the processor 120 may display the video and provide the information on the projection viewpoint.

Further, the processor 120 may analyze a frame which is subsequent to a currently displayed frame in real time. In this case, the processor 120 may display a frame where analysis was complete and provide the user with the information on the projection viewpoint at the same time.

Accordingly, the user may view an image corresponding to a desired projection viewpoint in real time.

In the above embodiment, the electronic apparatus 100 converts an original image itself and minimize and/or reduce an effect by the distorted region in the original image. In the following description, a method for minimizing and/or reducing an effect by a distorted region of an original image according other image processing method will be described in greater detail.

<Example Embodiment 2—Changing an Image Processing Method>

FIG. 8 is a diagram illustrating an example method for changing an image processing method according to an example embodiment of the present disclosure.

A filter (mask) may be used when information on connectivity with adjacent pixels is required to extract a feature for image analysis and may be applied to the entire image. For example, the filter may be used to extract a gradient of an image, perform an image smoothing operation, and determine similarity between a sample filter and an object to be recognized for object recognition.

An original image has a distorted region, and thus, a feature may be not extracted even by applying the filter to the entire image. By way of example, in case of an original image generated according to the equirectangular projection method, the distortion may become more intense towards the upper and lower sides. In this case, the operation of extracting a feature may be affected by the distorted region even by applying the filter.

Accordingly, the processor 120 may change a shape of a filter based on at least one of a location to which the filter is applied in the original image and a method for generating an original image. In this case, the method for generating an original image may refer to a projection method of a spherical image.

By way of example, as illustrated in FIG. 8, in case of the original image generated according to the equirectangular projection method, the image lengthens in a horizontal direction towards the upper and lower sides. In this case, the processor 120 may change a shape of the filter. For example, a filter 810 located in a center region of the original image as illustrated in the upper drawing of FIG. 8 may be changed to a filter 820 located in an upper region of the original image as illustrated in the lower drawing of FIG. 8.

FIG. 8 illustrates an example of an original image generated according to the equirectangular projection method, but not limited thereto. For example, the similar operation may be performed for an original image generated by any other projection method.

The processor 120 may change some of filter values while changing the shape of the filter and determine a value of an additional value through interpolation.

In the above description, the electronic apparatus 100 minimizes and/or reduces an effect by a distorted region of an original image by changing an image processing method. Particularly, the above embodiment was described by taking an example of a filter, but the similar method may be applied to other image processing methods.

Figure 9:
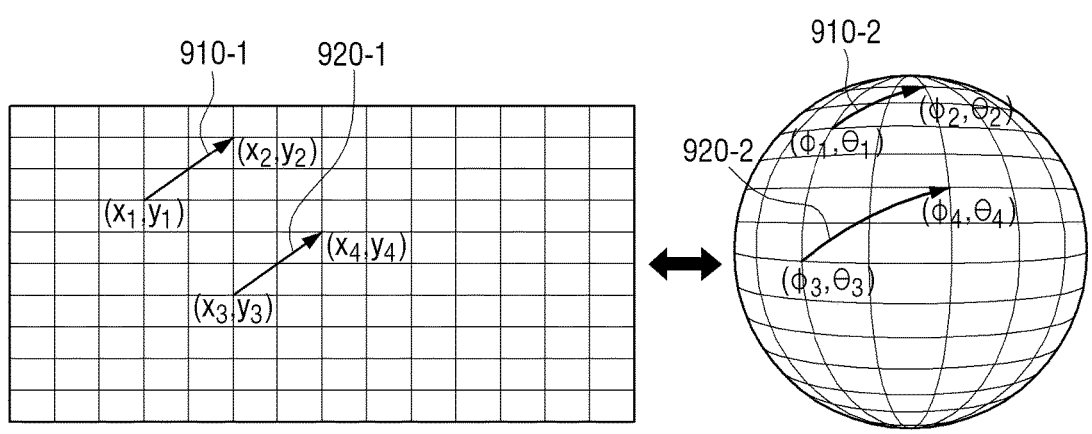
FIG. 9 is a diagram illustrating an example method for analyzing an image according to an example embodiment of the present disclosure.

FIG. 9 is a diagram illustrating an example method for analyzing an image according to an example embodiment of the present disclosure.

As illustrated in FIG. 9, the processor 120 may perform object tracking. Particularly, in multiple object tracking, the processor 120 may determine a moving route and calculate an expected location in a next frame based on coordinates of the objects. In this case, the processor 120 may track the coordinates of the objects using the spherical coordinate system.

For example, in case of using an original image as illustrated in the left drawing of FIG. 9, a moving distance of a first object 910-1 may be the same as a moving distance of a second object 920-1. In this case, the moving distance of each object may be distorted by a distorted region in the original image.

However, the processor 120 may calculate the moving distance through the spherical coordinate system. That is, as illustrated in the right drawing of FIG. 9, the processor 120 may calculate the moving distance of the first object 910-2 and the moving distance of the second object 920-2 through the spherical image. In this case, the moving distance of the first object 910-2 may become shorter than the moving distance of the second object 920-2.

Further, the processor 120 may calculate a moving direction or a moving speed of the object through the spherical coordinate system. The method for converting an original image to a spherical image was described above, and a description will not be repeated here.

The processor 120 may perform at least one of the image analysis operations, such as, extracting a feature independent from adjacent pixels, extracting a feature by considering adjacent pixels, performing calculation using pixel location information, and detecting an object, with respect to the original image.

The operation of extracting a feature independent from adjacent pixels may include extracting color information of a pixel from an image segmentation, for example. In this case, the processor 120 may use the spherical coordinate system and quantize (Y, θ). By way of example, the processor 120 may divide an angle ranging from 0 degree to 360 degrees to 1920 sections and store information. In response to the angles overlapping during quantization, the processor 120 may process an overlapped region by the above-described method for processing an overlapped region.

The processor 120 may use a 2D image generated according to the method of Embodiment 1 in order to detect an object. In other words, the processor 120 may detect an object using an image where the effect by the distorted region is minimal and/or reduced and compensate a bounded region thereby enhancing efficiency of object detection.

FIG. 10 is a flowchart illustrating an example method for processing an image of an electronic apparatus according to an example embodiment of the present disclosure.

The electronic apparatus converts an original image to a spherical image (S1010). The electronic apparatus may acquire a plurality of 2D images corresponding to a respective plurality of points on the spherical image by projecting the spherical image onto a plane with reference to the respective points (S1020). In response to image analysis for a certain region of the original image being started, the electronic apparatus selects a 2D image where a certain region is located in a predetermined region of each 2D image from among the plurality of 2D images and performs the image analysis for the certain region of the selected 2D image (S1030).

In this case, the acquiring (S1020) may include spreading the spherical image in a plurality of different directions at one or more points among the plurality of points and acquiring a plurality of 2D images corresponding to the one or more points.

The acquiring (S1020) may include dividing the spherical image to a plurality of regions, determining points for the respective regions, and acquiring the plurality of 2D images by projecting a corresponding region of the spherical image to the plane for each of the determined points.

Further, the acquiring (S1020) may include extending the respective regions so as to overlap each other and acquiring the plurality of 2D images by projecting the extended region of the spherical image to the plane for each of the determined points.

Meanwhile, in response to image processing for the overlapped region in the plurality of 2D images being performed and the plurality of 2D images being reconstructed to a new original image, the acquiring (S1020) may further include reconstructing the new original image using at least one of an average value, a median value, a maximum value, and a minimum value of pixels corresponding to each other in the overlapped region.

The acquiring (S1020) may include determining a plurality of additional regions including boundaries of the plurality of regions, determining additional points for the respective plurality of additional regions, and acquiring the plurality of 2D images by projecting a corresponding additional region of the spherical image to the plane with reference to the determined additional points.

The acquiring (S1020) may include dividing the spherical image to a plurality of new regions based on a new criterion different from the criterion for dividing the plurality of regions, determining points for the respective plurality of regions, and acquiring a plurality of new 2D images by projecting a corresponding region of the spherical image to the plane for the respective determined points. The performing the image analysis (S1030) may include performing the image analysis using the plurality of 2D images and the plurality of new 2D images.

The acquiring (S1020) may further include adding a certain region of a 2D image among the plurality of 2D images to a certain side of the 2D image and changing the 2D image.

The converting (S1010) may include respectively converting a plurality of successive original images in an original video to spherical images. In response to a random object being detected from a first spherical image which is one of the converted spherical images, the acquiring (S1020) may include acquiring a first 2D image by projecting the first spherical image to the plane with reference to a first point where the object was detected and detecting the object from a second spherical image which is subsequent to the first spherical image. In response to a distance between the first point and a second point where the object was detected being longer than a predetermined distance, the acquiring (S1020) may include acquiring a second 2D image by projecting a second spherical image to the plane with reference to the second point, and in response to the distance between the first point and the second point being shorter than the predetermined distance, the acquiring (S1020) may include acquiring the second 2D image by projecting the second spherical image to the plane with reference to the first point.

According to the above-described various embodiments, the electronic apparatus may acquire a plurality of 2D images from a spherical image and analyze the plurality of 2D images thereby minimizing and/or reducing the distortion which may occur while analyzing the spherical image.

The above example embodiments were described based on an example of an image, but the same methods may be applied to a video. That is, the processor may analyze the entire video by applying the image analyzing and processing methods for each frame of the video.

The methods according to above-described various embodiments may programmed and stored in diverse storage medium. Accordingly, the methods according to above-described various embodiments may be realized in various kinds of electronic apparatuses that execute the storage medium.

For example, a non-transitory computer readable medium including a program for sequentially executing the above-described control methods is provided.

The non-transitory computer readable medium refers to a machine-readable medium. For example, the above-described various applications and programs may be stored in and provided through the non-transitory computer readable medium, such as, for example, and without limitation, a Compact Disc (CD), a Digital Versatile Disc (DVD), a hard disc, a Blu-ray disc, a Universal Serial Bus (USB), a memory card, a Read-Only Memory (ROM), or the like.

As above, various example embodiments of the present disclosure have been illustrated and described. The foregoing example embodiments and advantages are merely examples and are not to be understood as limiting the present disclosure. The present teaching can be readily applied to other types of devices. Also, the description of the example embodiments is intended to be illustrative, and not to limit the scope of the claims, and many alternatives, modifications, and variations will be apparent to a person having ordinary skill in the art.

What is claimed is:

1. An electronic apparatus comprising:
a storage; and
a processor configured to:
convert an original image to a spherical image,
acquire a plurality of two-dimensional (2D) images corresponding to a respective plurality of points on the spherical image by projecting the spherical image onto a plane with reference to the respective plurality of points on the spherical image, wherein the plurality of two-dimensional (2D) images overlap with each other regarding the spherical image so that a given area of the spherical image is present in each of the plurality of two-dimension images and is distorted to different extents in each of the plurality of two-dimensional images, and
store the acquired 2D images in the storage.

2. The apparatus as claimed in claim 1, wherein the processor is configured to acquire a plurality of 2D images corresponding to one or more points among the plurality of points by projecting the spherical image in a plurality of different directions at the one or more points.

3. The apparatus as claimed in any of claim 1, wherein in response to image analysis for a certain region of the original image being started, the processor is configured to select a 2D image where the certain region is located in a predetermined region of each 2D image from among the plurality of 2D images and to perform the image analysis for the certain region in the selected 2D image.

4. The apparatus as claimed in claim 1, wherein the processor is configured to divide the spherical image into a plurality of regions, to identify the points for the respective plurality of regions, and to acquire the plurality of 2D images by projecting a corresponding region of the spherical image onto the plane for each of the identified points.

5. The apparatus as claimed in claim 4, wherein the processor is configured to extend the respective plurality of regions to overlap each other and to acquire the plurality of 2D images by projecting the respective extended regions of the spherical image onto the plane for each of the identified points.

6. The apparatus as claimed in claim 5, wherein in response to image processing for an overlapped region in the plurality of 2D images being performed and the plurality of 2D images being reconstructed to a new original image, the processor is configured to reconstruct the new original image using at least one of: an average value, a median value, a maximum value, and a minimum value of pixels corresponding to each other in the overlapped region.

7. The apparatus as claimed in claim 4, wherein the processor is configured to identify a plurality of additional regions including boundaries of the plurality of regions, to identify additional points for the respective plurality of additional regions, and to acquire a plurality of additional 2D images by projecting a corresponding additional region of the spherical image onto the plane with reference to the identified additional points.

8. The apparatus as claimed in claim 4, wherein the processor is configured to divide the spherical image into a plurality of new regions based on a new criterion different from a criterion for dividing the plurality of regions, to identify the points for the respective plurality of new regions, to acquire a plurality of new 2D images by projecting a corresponding region of the spherical image onto the plane for each of the identified points, and to perform the image analysis using the plurality of 2D image and the plurality of new 2D images.

9. The apparatus as claimed in claim 1, wherein the processor is configured to add a certain region of a 2D image from among the plurality of 2D images to a certain side of the 2D image and to change the 2D image.

10. The apparatus as claimed in claim 1, wherein the storage stores an original video including a plurality of successive original images,
wherein the processor configured to convert the plurality of original images to spherical images respectively, and in response to a random object being detected from a first spherical image which is one of the converted spherical images, to acquire a first two-dimensional (2D) image by projecting the first spherical image onto the plane with reference to a first point where the object was detected,
wherein the processor is configured to detect the object from a second spherical image subsequent to the first spherical image, in response to a distance between the first point and a second point where the object was detected being at least longer than a predetermined distance, to acquire a second two-dimensional (2D) image by projecting the second spherical image onto the plane with reference to the second point, and in response to the distance between the first point and the second point being shorter than the predetermined distance, to acquire the second 2D image by projecting the second spherical image onto the plane with reference to the first point.

11. The apparatus as claimed in claim 1, further comprising:
a display,
wherein the processor is configured to control the display to display a predetermined first region of one of the plurality of 2D images, to detect a 2D image where a predetermined object is located in a predetermined second region of each 2D image from among the plurality of 2D images, and to store information on the detected 2D image in the storage.

12. A method for processing an image of an electronic apparatus, the method comprising:
converting an original image to a spherical image;
acquiring a plurality of two-dimensional (2D) images corresponding to a respective plurality of points on the spherical image by projecting the spherical image onto a plane with reference to the respective plurality of points on the spherical image, wherein the plurality of two-dimensional (2D) images overlap with each other regarding the spherical image so that a given area of the spherical image is present in each of the plurality of two-dimension images and is distorted to different extents in each of the plurality of two-dimensional images; and
selecting, in response to image analysis for a certain region of the original image being started, a 2D image where the certain region is located in a predetermined region of each 2D image from among the plurality of 2D images and performing the image analysis for the certain region in the selected 2D image.

13. The method as claimed in claim 12, wherein the acquiring comprises acquiring a plurality of 2D images corresponding to one or more points among the plurality of points by projecting the spherical image in a plurality of different directions at the one or more points.

14. The method as claimed in claim 12, wherein the acquiring comprises dividing the spherical image to a plurality of regions, identifying the points for the respective plurality of regions, and acquiring the plurality of 2D images by projecting a corresponding region of the spherical image onto the plane for each of the identified points.

15. The method as claimed in claim 14, wherein the acquiring comprises extending the respective plurality of regions to overlap each other and acquiring the plurality of 2D images by projecting the respective extended regions of the spherical image onto the plane for each of the identified points.

16. The method as claimed in claim 15, further comprising: performing image processing for an overlapped region in the plurality of 2D images; and reconstructing, in response to the plurality of 2D images being reconstructed to a new original image, the new original image using at least one of: an average value, a median value, a maximum value, and a minimum value of pixels corresponding to each other in the overlapped region.

17. The method as claimed in claim 14, wherein the acquiring comprises identifying a plurality of additional regions including boundaries of the plurality of regions, identifying additional points for the respective plurality of additional regions, and acquiring a plurality of additional 2D images by projecting a corresponding additional region of the spherical image onto the plane with reference to the identified additional points.

18. The method as claimed in claim 14, wherein the acquiring comprises dividing the spherical image to a plurality of new regions based on a new criterion different from a criterion for dividing the plurality of regions, identifying the points for the respective plurality of new regions, and acquiring a plurality of new 2D images by projecting a corresponding region of the spherical image onto the plane for each of the identified points,
wherein the performing the image analysis comprises performing the image analysis using the plurality of 2D images and the plurality of new 2D images.

19. The method as claimed in claim 12, further comprising: adding a certain region of a 2D image among the plurality of 2D images to a certain side of the 2D image and changing the 2D image.

20. The method as claimed in claim 12, wherein the converting comprises converting a plurality of successive original images of an original video to spherical images, respectively,
wherein in response to a random object being detected from a first spherical image which is one of the converted spherical images, the acquiring comprises acquiring a first two-dimensional (2D) image by projecting the first spherical image onto the plane with reference to a first point from which the object was detected,
wherein the acquiring comprises detecting the object from a second spherical image subsequent to the first spherical image, in response to a distance between the first point and a second point from which the object was detected being at least longer than a predetermined distance, acquiring a second two-dimensional (2D) image by projecting the second spherical image onto the plane with reference to the second point, and in response to the distance between the first point and the second point being shorter than the predetermined distance, acquiring the second 2D image by projecting the second spherical image onto the plane with reference to the first point.

* * * * *